United States Patent [19]

Rogers, Jr.

[11] 4,133,727

[45] Jan. 9, 1979

[54] METHOD FOR EXTRACTING HEAT FROM A CHAMBER CONTAINING A MOLTEN SALT

[75] Inventor: Elmer H. Rogers, Jr., Palestine, Tex.

[73] Assignee: Aluminum Company of America, Pittsburgh, Pa.

[21] Appl. No.: 797,747

[22] Filed: May 17, 1977

[51] Int. Cl.$^2$ .................. C25C 3/00; C25C 3/02; C25C 3/06

[52] U.S. Cl. .................. 204/67; 204/64 R; 204/243 R

[58] Field of Search .............. 204/64 R, 67, 68, 243, 204/247, 262

[56] References Cited

U.S. PATENT DOCUMENTS

| | | | |
|---|---|---|---|
| 1,569,606 | 1/1926 | Ashcroft | 204/244 |
| 3,784,371 | 1/1974 | Bongs et al. | 75/68 R |
| 3,822,195 | 7/1974 | Dell et al. | 204/64 R |

*Primary Examiner*—Howard S. Williams
*Attorney, Agent, or Firm*—Daniel A. Sullivan, Jr.

[57] ABSTRACT

A method is disclosed by which heat may be extracted from an electrolysis chamber containing a molten salt bath. The method includes providing the chamber with a portion having a surface bordering directly on a gas space above the molten salt bath. Constituents from the bath are spewed and/or evaporated into this gas space. The mentioned portion is cooled so that the temperature of the surface bordering on the gas space is at least 200° C below the bath temperature and above the freezing point of the mentioned constituents. This allows the constituents to deposit on the mentioned portion in liquid form, and drop back into the bath.

9 Claims, 2 Drawing Figures

METHOD FOR EXTRACTING HEAT FROM A CHAMBER CONTAINING A MOLTEN SALT

BACKGROUND OF THE INVENTION

The present invention relates to a method for extracting heat from a chamber containing a molten salt bath. More particularly, the present invention relates to a technique for extracting heat from a molten salt electrolysis cell.

U.S. Pat. No. 3,893,899 issued July 8, 1975, in the name of M. B. Dell et al. for "Electrolytic Cell for Metal Production" shows a cell applicable for the electrolysis of aluminum chloride dissolved in a molten salt bath. The cell illustrated there has an outer steel shell. Everywhere on the interior of this shell there is provided insulation in the form of brick, etc.

SUMMARY OF THE INVENTION

A disadvantage of the cell displayed in the above-mentioned 3,893,899 is that the insulation holds-in heat. It is difficult to remove heat from the cell. It is an object of the present invention to provide a method for improved extracting of heat from a chamber in the form of an electrolysis cell containing a molten salt bath.

This as well as other objects which will become apparent in the discussion that follows are achieved according to the present invention by a method including providing a portion on the chamber, which portion has a surface bordering directly on a gas space above the bath. In this gas space, constituents from the bath are contained. These constituents will always include, as will be understood on the basis of thermodynamic considerations, material which has evaporated from the bath. These constituents may also contain material which has been spewed from the bath, this situation being possible e.g. whenever gases are being evolved from the bath such as may occur when electrolysis is being carried out in the bath. Spewing is especially likely above a gas lift passage such as disclosed in 3,839,899. On the above-mentioned portion, according to the invention, a cooling means is provided for maintaining the mentioned surface at a temperature at least 200° C. below the temperature of the bath. On the other hand, according to the present invention, the temperature of this surface is not allowed to fall so low as to reach the freezing point of the mentioned constituents. In this way, the constituents can deposit on the mentioned portion in liquid form and drop back to the bath. The resulting movement of material from the bath first as constituents in the gas space, then as liquid on the mentioned portion, and finally as liquid that has fallen back to the bath provides a transfer of heat from the bath to the mentioned portion. In general, this will not be the only way in which heat is transferred from the bath to the mentioned portion. Radiation heat transfer will always be present and it is even believed that this can be the predominant form of heat transfer from the bath to the mentioned portion.

DESCRIPTION OF THE PREFERRED EMBODIMENTS

Figure 1:
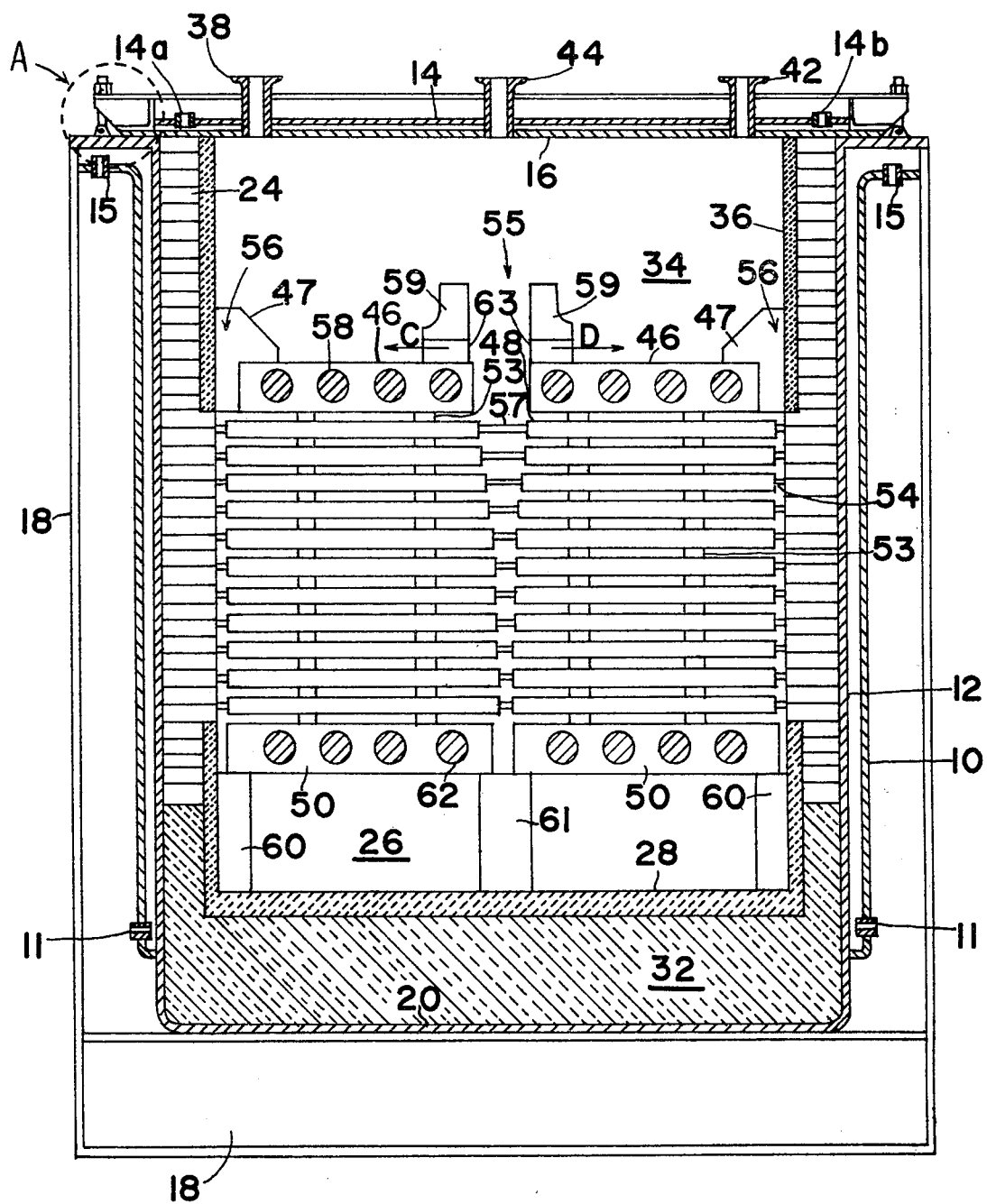
FIG. 1 is a sectional end elevation of a cell for producing metal.
Figure 1A:
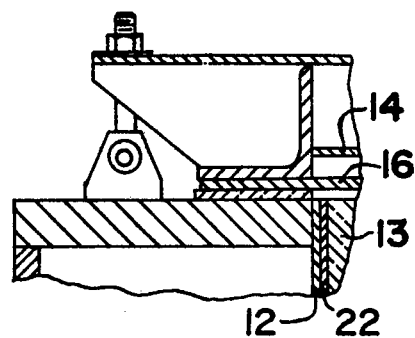
FIG. 1A is an enlarged view of the portion of the cell indicated by the arrow A in FIG. 1.

A cell for electrolytically producing aluminum by the electrolysis of aluminum chloride dissolved in a molten salt bath utilizing the present invention is illustrated in the drawings. In particular, referring to FIGS. 1 and 1A, the cell structure includes an outer steel cooling jacket 10, which surrounds the steel sides 12 of the cell. A cooling fluid (coolant), for example water, flows through jacket 10 for withdrawing heat from the cell. The coolant enters the cooling jacket at coolant inlet ports 11, and is removed at exit nozzles 15.

In accordance with the present invention, a similar cooling jacket 14, with representative coolant inlet port 14a and coolant outlet port 14b, covers the lid 16 of the cell. The under surface of lid 16 is exposed directly to chlorine and salt vapors and is made of a suitably chlorine resistant metal such as the alloy nominally containing 80% Ni, 15% Cr, and 5% Fe and sold under the trademark Inconel. Lid 16 is thus one embodiment of the portion referred to above in the Summary.

All water pipes running to and from the ports of the cooling jackets are provided with rubber hose electrical breaks, so that electrical current cannot move to or from the cell along the otherwise metallic pipes.

A structural containment 18, for example of steel, encloses and supports the cell and the cooling jacket. In general, it has been found to be good practice to isolate the cell from the floor, for instance by setting containment 18 on an insulating material such as a thermoset plastic material made from fabric or paper impregnated with phenolformaldehyde resin, for instance the material supplied under the trademark Micarta by Westinghouse Electric Corp.

The bath containing cell interior surfaces, i.e. those formed by sides 12 and steel bottom 20, are lined with a continuous, corrosion-resistant, electrically insulating lining 22 of plastic or rubber material. Good results have been obtained with a lining 22 composed of alternating layers of thermosetting epoxy-based paint and glass fiber cloth. Other plastic or rubber materials are possible.

Inwards of the lining 22 is interposed a glass barrier 13. For further information concerning this glass barrier, see U.S. Pat. Nos. 3,773,643 and 3,779,699 issued, respectively, Nov. 20 and Dec. 18, 1973 in the names of A. S. Russell and L. L. Knapp for "Furnace Structure". The cell is also lined with refractory side wall brick 24, made of thermally insulating, electrically nonconductive, nitride material which is resistant to a molten aluminum chloride-containing halide bath and the decomposition products thereof (see U.S. Pat. No. 3,785,941 issued Jan. 15, 1974, in the name of S. C. Jacobs for "Refractory for Production of Aluminum by Electrolysis of Aluminum Chloride").

An additional lining 36 of graphite is positioned on the side walls alongside and above the anodes 46 to provide further protection against the corrosive influence of the bath and the chlorine gas produced by the operation of the cell. It may be advantageous not to extend this lining 36 right up to lid 16. Rather, ending its upwards reach short of lid 16 can eliminate a danger of short circuiting.

The cell cavity includes a sump 26 in its lower portion for collecting the aluminum metal produced. The sump is bounded by a tub 28 made of graphite. The upper part of tub 28 extends up alongside the cathodes 50. Tub 28 sits on refractory floor 32 including the glass barrier 13.

The cell cavity also includes a bath reservoir 34 in its upper zone. A first port, tapping port 38, extending through the lid 16 into bath reservoir 34, provides for insertion of a vacuum tapping tube (See British Pat. No. 687,758 of H. Grothe, published Feb. 18, 1953.) down into sump 26, through an internal passage (not shown), for removing molten aluminum. A second port, feeding port 42, provides inlet means for feeding aluminum chloride into the bath. A third port, vent port 44, provides outlet means for venting chlorine. These ports are shown open on their tops in FIG. 1 just as a matter of convenience. During cell operation, port 38 may have vacuum tapping apparatus associated with it while port 42 will have a feeder mechanism attached to it and port 44 will be connected to a pipeline for carrying-away the chlorine-rich effluent.

Within the cell cavity are a plurality of plate-like electrodes disposed in two stacks. In the direction perpendicular to the plane of FIG. 1, in which direction the depth of the electrodes lies, the electrodes extend such that they abut against the lining of the cell. Each stack includes an upper anode 46, desirably an appreciable number of bipolar electrodes 48 (11 being shown), and a lower cathode 50, all being made, for example, of graphite. These electrodes are arranged in superimposed, spaced relationship defining a series of interelectrode spaces within the cell. Each electrode is preferably horizontally disposed within a vertical stack.

Each cathode 50 is supported by a plurality of graphite lateral support pillars (e.g. pillars 60) and central support pillars (e.g. pillars 61). In the direction of the depth of the electrodes, there are other pillars behind those shown. These hidden pillars are spaced from those shown and from one another, so that bath circulation through sump 26 is possible.

The remaining electrodes are stacked one above the other in a spaced relationship maintained by refractory spacers 53 in the interelectrode spaces, and are connected to, and spaced from, the side walls by individual insulating pins 54. These spacers 53 are dimensioned to closely space the electrodes, as for example to space them with their opposed surfaces separated by less than ¾ inch.

Above the stacks, hold-down blocks 47 bear on the upper surfaces of the anodes 46 to maintain the stacks in place.

In the illustrated embodiment, 12 interelectrode spaces are formed between opposed electrodes in each stack, one interelectrode spaced between cathode 50 and the lowest of the bipolar electrodes, 10 between successive pairs of intermediate bipolar electrodes, and one between the highest of the bipolar electrodes and anode 46. Each interelectrode space is bounded above by an electrode lower surface (which functions as an anodic surface) and below by an electrode upper surface (which functions as a cathodic surface). The spacing therebetween is referred to as the anode-cathode distance (the electrode-to-electrode distance is the effective anode-cathode distance, due to the sweeping action of the bath, which removes the aluminum as it is formed; this sweeping is disclosed in the above-mentioned 3,893,899). As brought out in 3,893,899, the anodic surfaces may have chlorine removing channels for getting the chlorine rapidly out of the electrolysis-effective interelectrode spaces.

The molten salt bath has been omitted from the cell for the purpose of better exposing the internal structure of the cell. The bath level in the cell will vary in operation but normally will lie above the anode 46 to fill all otherwise unoccupied space below within the cell. For the solution of aluminum chloride for its electrolysis, a bath based on alkali metal halides and/or alkaline earth metal halides is suitable, chlorides being preferred.

Between the stacks of electrodes is located a gas-lift passage 55, maintained by spacers 57. The widths of the electrodes in the stacks are so chosen that the gas-lift passage 55 has its greatest breadth between the anodes 46, the breadth decreasing as one moves down the stacks, with the smallest breadth being between the lowest bipolar electrodes. The gas-lift passage 55 provides for the upward circulation of the bath material to the reservoir 34 after passage thereof through the interelectrode spaces, the flow being induced by the gas-lift effect of the chlorine gas internally produced by electrolysis in the interelectrode spaces. Bath constituents spewed from passage 55 may land on the under surface of lid 16 bordering directly on the gas space lying in the upper portion of reservoir 34 above the upper surface of the bath. The under surface of lid 16 is not kept so cold that constituents like these, or constituents evaporated from the bath, will freeze onto the lid, but the lid is nevertheless kept at least 200° C., more preferably at least 400° C., most preferably at least 600° C. below the temperature of the bath, so that heat is extracted from the liquid, i.e. molten, salt flung or condensed onto lid 16. The liquid salt load on the lid will build up to a certain extent, and then it starts dropping, or flowing down the interior side walls, back into the bath. In such way and combined with e.g. radiation heat transfer, e.g. 50% of the heat extraction from a cell such as in FIG. 1 can be made through the roof. In the illustrated embodiment, it is especially important not to freeze slat on the under surface of lid 16, because such would result in the clogging-up, and finally completely closing-off, of e.g. vent port 44. Vent port 44 must remain free, i.e. unobstructed, during cell operation, so that the generated chlorine can be removed.

The above-mentioned chlorine removing channels in the anode surfaces may be extended right into the passage 55, while being blocked-off on their opposite ends. It has been found that this aids in getting the chlorine started in the right direction, i.e. toward, and into, passage 55. Once the chlorine gets started flowing in the desired direction and provided the various flow cross sections in the cell have been properly dimensioned, the chlorine keeps going in that direction. Thus, the blocking-off of one side of the channels is not indispensible. The gas flow can be gotten started in the desired direction by other means, for example by using a mechanical pumping of the bath or by introducing a pulse of gas at the bottom of passage 55. The dimensioning of passage 55, and the remainder of the flow cross sections in any particular cell, is advantageously carried out using water modeling techniques.

Upcomer dams 59, located adjacent the exit end of the gas lift passage above the anodes, serve to prevent unwanted rechlorination of the electrolyzed metal. The upper portions of the dams protrude above the upper level of the bath into the gas space in the upper portion of reservoir 34 and force the lateral flow of the bath above the electrodes to be through passageways 63 in the direction of arrows C and D. Passageways 63 open on both sides of each dam 59 below the surface of the bath, while the bath surface lies below the top of dam 59. The resulting flowpath resists the tendency of pieces of molten metal, which are brough upwards in the passage 55, from breaking the bath surface and getting rechlorinated by the metal-oxidizing chlorine in reservoir 34 above the surface of the bath. It would be best if most of the metal produced on the cathodic surfaces would fall in passage 55 to sump 26, because any metal which is swept upwards can get rechlorinated if it breaks through the upper surface of the bath. This would adversely affect current efficiency. It is to guard against this eventuality that dams 59 are provided. Preferably, the bath flow velocity in the directions of arrows C and D is great enough to perform the sweeping action of 3,893,899 on the top of anodes 46 in the same manner that the cathodic surfaces in the interelectrode spaces are swept.

With the bath lying below the tops of dams 59, it will be realized that additional surface effective in the method of the present invention can be created by removing glass barrier 13, brick 24, and lining 36 down to the level of the tops of dams 59.

Between each electrode stack and the refractory side walls 24 are two bath supply passages 56 extending past each interelectrode space and past the bipolar electrodes, anode 46 and cathode 50. Each passage 56 is maintained by pins 54, by which there is on each side of the cell a series of aligned gaps between the cell walls and the electrodes, these aligned gaps forming the two passages 56. The movement of bath in the passages 56 is first downwardly past anodes 46, thus passing first into the outside regions of the uppermost interelectrode spaces where portions of the bath split-off to supply and sweep the uppermost interelectrode spaces. Focussing on either of the two sides, the remainder of the bath then flows downwardly past the outside of the next electrode to the outside of the next interelectrode space, and so on. A final portion of the bath may flow on through the openings on the outside of the cathodes 50 into, through the sump 26, then up into passage 55. As brought out above, design of the dimensions of the various parts of the gas-lift and bath supply passages can be carried out advantageously using the principles of water modeling to assure that the forming metal is swept out of each interelectrode space without substantial accumulation of the metal on the cathodic surfaces.

The anode has a plurality of electrode bars 58 inserted therein which serve as positive current leads, and the cathode has a plurality of collector bars 62 inserted therein which serve as negative current leads. The bars extend through the cell and cooling jacket walls and are suitably insulated therefrom. (See e.g. U.S. Pat. No. 3,745,106 issued July 10, 1973, in the name of S. C. Jacobs for "Fluid Sheathed Electrode Lead for Use in a Corrosive Environment".)

Further illustrative of the present invention is the following example:

EXAMPLE

The cell was filled with an average molten salt bath of the following composition in weight percent:
NaCl; 51.0
LiCl; 40.0
AlCl$_3$; 6.5
MgCl$_2$; 2.5

The walls of cells working with this composition plus naturally occurring impurities have been found, upon autopsy, always to contain salt compositions which are at least partially molten at room temperature. Electrolysis to produce molten aluminum and chlorine was carried out at an average temperature of 715° C. Water was circulated through jacket 14 to keep the under surface of lid 16 at 120° F. (about 50° C.). When the cell was later opened, essentially no encrustation of bath on the under surface of the lid was noted, nor had the lid been corroded by the chlorine. (The Inconel metal of lid 16 does corrode in this environment if the under surface temperature goes above 530° C.) It is to be noted that the sublimation temperature of AlCl$_3$ is certainly above the 120° F. temperature of the lid under surface, but the bath constituents reaching the lid exert a fluxing action to prevent AlCl$_3$ from depositing in solid form on the lid.

It will be understood that the above description of the present invention is susceptible to various modifications, changes, and adaptations and the same are intended to be comprehended within the meaning and range of equivalents of the appended claims.

What is claimed is:

1. A method for extracting heat from a chamber containing a molten salt bath, said chamber being an electrolysis cell, comprising:
   providing a portion on the chamber, said portion having a surface bordering directly on a gas space above the bath, which gas space contains constituents spewed and/or evaporated from the bath; and
   providing a cooling means on said portion for maintaining said surface at a temperature at least 200° C. below the temperature of the bath and above the freezing point of said constituents, whereby said constituents can deposit on said surface in liquid form and drop back into the bath.

2. The method of claim 1 wherein said surface is maintained at least 400° C. below the temperature of the bath.

3. The method of claim 1 wherein said surface is maintained at least 600° C. below the temperature of the bath.

4. The method of claim 1 wherein the chamber has a refractory lining in the region containing said bath.

5. The method of claim 1 wherein said portion is metal.

6. The method of claim 1 wherein said chamber is and electrolysis cell in which the electrolysis of aluminum chloride is being carried out, the aluminum chloride being dissolved in said bath, said bath consisting essentially of salts from the group consisting of alkali metal halides and alkaline earth metal halides.

7. The method of claim 6 wherein said halides are chlorides.

8. The method of claim 6 wherein said portion is metal, the cooling means maintaining said surface at a temperature low enough that it does not corrode.

9. The method of claim 1 wherein said portion has a port that must remain unobstructed during cell operation.

* * * * *

UNITED STATES PATENT AND TRADEMARK OFFICE
CERTIFICATE OF CORRECTION

PATENT NO. : 4,133,727
DATED : January 9, 1979
INVENTOR(S) : Elmer H. Rogers, Jr.

It is certified that error appears in the above-identified patent and that said Letters Patent are hereby corrected as shown below:

Under "References Cited"  After "3,784,371", change "Bongs et al." to --Bangs et al.--.

Col. 4, line 37  Change "slat" to --salt--.

Col. 5, line 3  Change "brough" to --brought--.

Col. 6, line 50 (claim 6)  Change "and" to --an--.

Signed and Sealed this

Twenty-fourth Day of April 1979

[SEAL]

Attest:

RUTH C. MASON
Attesting Officer

DONALD W. BANNER
Commissioner of Patents and Trademarks